United States Patent

Omura et al.

[11] Patent Number: 6,050,803
[45] Date of Patent: Apr. 18, 2000

[54] GOLF BALL MOLD

[75] Inventors: Yoichi Omura; Keisuke Ihara, both of Chichibu, Japan

[73] Assignee: Bridgestone Sports Co., Ltd., Tokyo, Japan

[21] Appl. No.: 08/992,712

[22] Filed: Dec. 17, 1997

[30] Foreign Application Priority Data

Dec. 19, 1996 [JP] Japan .................................. 8-354535

[51] Int. Cl.[7] ........................... B29C 45/14; B29C 45/26
[52] U.S. Cl. .......................... 425/116; 249/103; 425/577
[58] Field of Search .................................... 425/116, 127, 425/129.1, 577, 812; 249/103

[56] References Cited

U.S. PATENT DOCUMENTS

| | | | |
|---|---|---|---|
| 5,038,504 | 8/1991 | Modigh | 249/103 |
| 5,122,046 | 6/1992 | Lavallee et al. | 425/577 |
| 5,874,116 | 2/1999 | Takano | 425/812 |

*Primary Examiner*—Tim Heitbrink
*Attorney, Agent, or Firm*—Sughrue, Mion, Zinn, Macpeak & Seas, PLLC

[57] ABSTRACT

A golf ball mold includes a pair of mold sections which are removably mated to define a spherical cavity therein, a plurality of support pins for supporting a core at the center of the cavity, and a degassing pin. At least one of the pins is provided at its distal end face with a projection for stamping a symbol. The mold is capable of stamping an identification mark on golf balls at the same time as their molding. The mark is successively stamped on the balls at a predetermined position to a constant clearness in a simple accurate manner.

9 Claims, 3 Drawing Sheets

GOLF BALL MOLD

BACKGROUND OF THE INVENTION

1. Field of the Invention

This invention relates to a golf ball mold capable of successively stamping an identification mark on golf balls in a simple and accurate manner.

2. Prior Art

In the past, golf balls bear an identification mark consisting of alphabet and numerical letters on their surface. The identification mark typically indicates the date and lot number of manufacture of golf balls.

In the prior art, such a mark is stamped on a golf ball using a stamping machine as shown in FIG. 6. The stamping machine designated at 20 includes a base 21, a circular table 22 resting on the base 21, an arm 23 pivotally connected to the base 21 for movement toward and away from the base, a holder 24 on the arm 23, and a stamp rod 25 received in the holder 24. The stamp rod 25 has a distal end face provided with a projection for stamping a symbol. In use, a golf ball G is secured on the table 22, and the arm 23 is pivotally moved downward to press the stamp rod 25 at its distal end against the surface of the golf ball G. Then the numerical or character symbol is stamped on the golf ball surface in the manner that the golf ball is locally compressed.

The prior art method, however, has several problems. It is difficult to accurately place all golf balls G to be stamped on the table 22 always at a predetermined position. In a usual practice, a ball is placed at an approximate position and stamped. Then the stamping position is not consistent throughout all balls. Since the pressing and stamping operation is manually carried out, the state of stamped symbols is not consistent. Some balls bear vaguely stamped symbols. Inversely, if the pressing operation is excessively strong, balls can be distorted thereby. The stamping operation requires the worker to carefully manipulate the stamping machine in a slow, accurate manner in order that the stamping position and the clearness of stamped letters be as constant as possible. The operation is laborious work requiring many moves and patience and thus needs skilled workers.

SUMMARY OF THE INVENTION

An object of the present invention is to provide a novel and improved golf ball mold capable of molding golf balls and simultaneously stamping an identification mark on the golf balls at a predetermined position to a constant depth in a simple, accurate, successive manner.

In a first aspect, the invention provides a golf ball mold comprising a pair of mold sections which are removably mated to define a spherical cavity therein, a plurality of core support pins for supporting a core at the center of the cavity, and a degassing pin for venting the gas in the cavity. The core support pins and the degassing pin each have a distal end face disposed in the cavity. At least one of the distal end faces is provided with a projection for stamping a symbol.

In a second aspect, the invention provides a golf ball mold comprising a pair of mold sections which are removably mated to define a spherical cavity between their inner surfaces. The cavity surfaces are provided with a plurality of dimple-forming protrusions. Some of the dimple-forming protrusions are constructed by dimple-forming pins having substantially the same distal end face shape as the protrusions. The distal end face of at least one dimple-forming pin is provided with a projection for stamping a symbol. Preferably the mold further include a plurality of core support pins for supporting a core at the center of the cavity and a degassing pin for venting the gas in the cavity. The core support pins and the degassing pin each have a distal end face disposed in the cavity, and at least one of the distal end faces is provided with a projection for stamping a symbol.

Instead of stamping a mark on molded golf balls having dimples, the invention intends to stamp a mark on golf balls while the golf balls are being molded. The mold of the invention has a function of stamping a mark on golf balls at the same time as their molding. An identification mark can be stamped on the golf balls at a predetermined position to a constant depth in a simple, accurate, successive manner. The invention eliminates the extra stamping step and improves the efficiency of golf ball manufacture.

Since the distal end face of selected ones of the core support pins, degassing pins, and dimple-forming pins is provided with a projection for stamping a symbol according to the invention, the manual stamping operation requiring careful attention and skill in the prior art is eliminated. Symbols may be stamped at plural sites on the ball surface and always at the same position throughout balls. When it is desired to change the identification mark, the only requirement is to exchange the pins having stamping projections with a new set of pins having different stamping projections. This exchange operation is quite easy.

BRIEF DESCRIPTION OF THE INVENTION

DETAILED DESCRIPTION OF THE INVENTION

Figure 1:
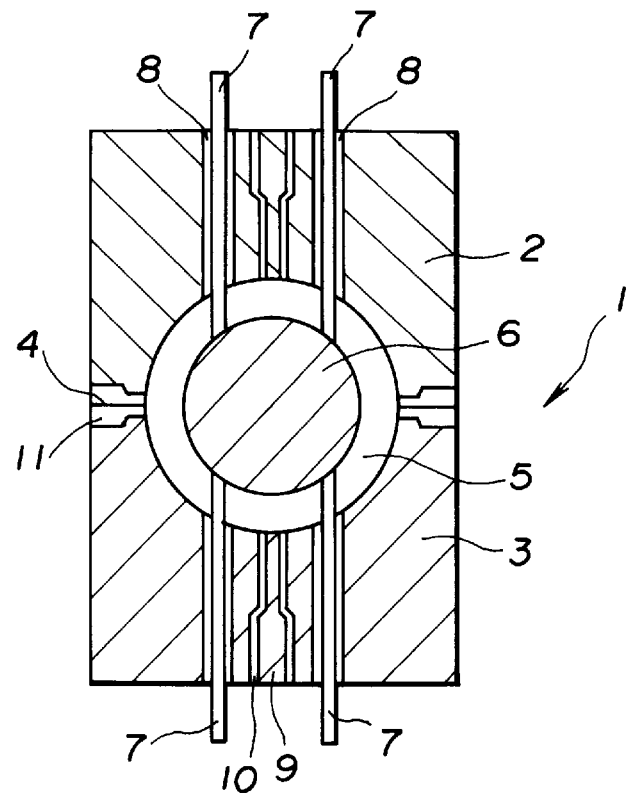
FIG. 1 is a schematic cross-sectional view of a mold equipped with core support pins and degassing pins according to one embodiment of the invention.

FIG. 1, illustrates a golf ball mold according to one embodiment of the invention. The golf ball mold generally designated at 1 includes a pair of upper and lower mold sections 2 and 3 which are removably mated along a parting surface 4 to define a hollow spherical cavity 5 therein. Each of the upper and lower mold sections 2 and 3 is provided with a plurality of bores 8 in which a corresponding plurality of core support pins 7 are received for axial motion and a degassing bore 10 in which a stationary degassing pin 9 is received. The support pins 7 are secured at a suitable position for supporting a core 6 at the center of the cavity 5, which is ready for molding. The pin 9 and the bore 10 defines a gap for venting the gas in the cavity to the outside. The mold 1 is further provided with a gate 11 for injecting a cover stock into the cavity 5. Though not shown, the cavity surface of this embodiment is given a negative dimple pattern as in the embodiments of FIGS. 2 and 3 which will be described later.

Figure 5:
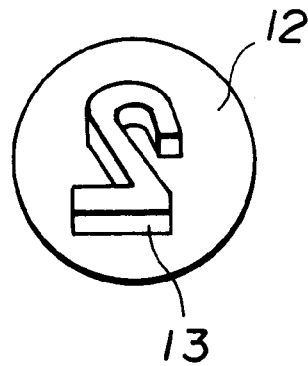
FIG. 5 is an enlarged perspective view of a symbol stamping projection.
Figure 6:
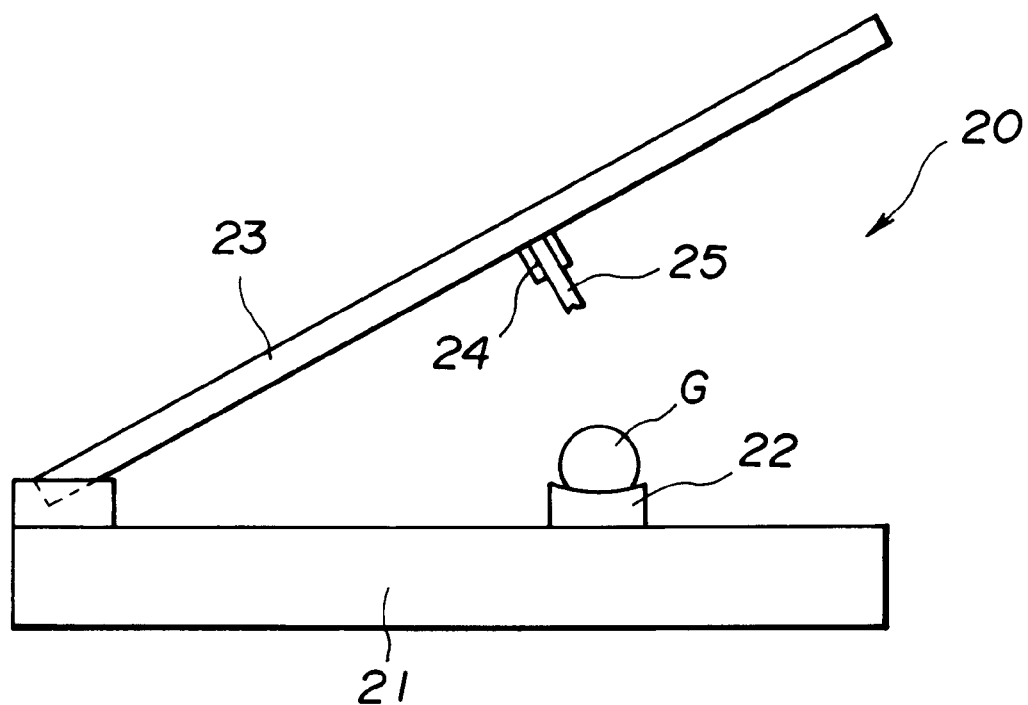
FIG. 6 illustrates a prior art golf ball stamping machine.

The core support pins 7 and the degassing pin 9 have distal end faces disposed in the cavity 5. Some or all of the pins 7 and 9 are provided at their distal end face with a projection for stamping a symbol. As shown in FIG. 5, the distal end face 12 is provided with a projection 13 for stamping a symbol. The stamping projection 13 corresponds to a numeral "2" in the illustrated embodiment of FIG. 5 although the identification mark to be stamped is not limited to numerals. The mark may be selected from numerals, alphabet letters, Chinese characters, Japanese characters, and other symbols like ○, Δ, X, and star.

Using the mold of the invention, a golf ball is molded as follows. First, by properly projecting the support pins 7 into the cavity 5, the core 6 is held at the center of the cavity 5 as shown in FIG. 1. While a vacuum pump (not shown) is operated to vent the air and gas in the cavity 5 through the gaps between the degassing holes 10 and the stationary pins 9, a molten cover stock is injected into the cavity 5 through the gate 11. Immediately before or after the completion of injection, the core support pins 7 are withdrawn until their distal end faces 12 become flush with the cavity surface. In this state, the molding of the cover stock is completed.

The procedure of molding a golf ball using the mold of the invention is the same as in the prior art injection molding procedure using a mold of this type. According to the invention, after the introduction of the cover stock, the symbol stamping projections 13 on some or all of the core support pins 7 and stationary pins 9 are in contact with the surface of the cover being molded. Then upon removal from the mold, the golf ball already has the identification mark thereon. Accordingly, simply by repeating injection molding shots, the mark can be successively stamped on golf balls at the predetermined position to constant clearness. When it is desired to change the identification mark, it is only necessary to exchange the pins having stamping projections with a new set of pins 7 and 9 having different stamping projections. The mark can be changed by a quite easy pin exchange operation.

Figure 2:
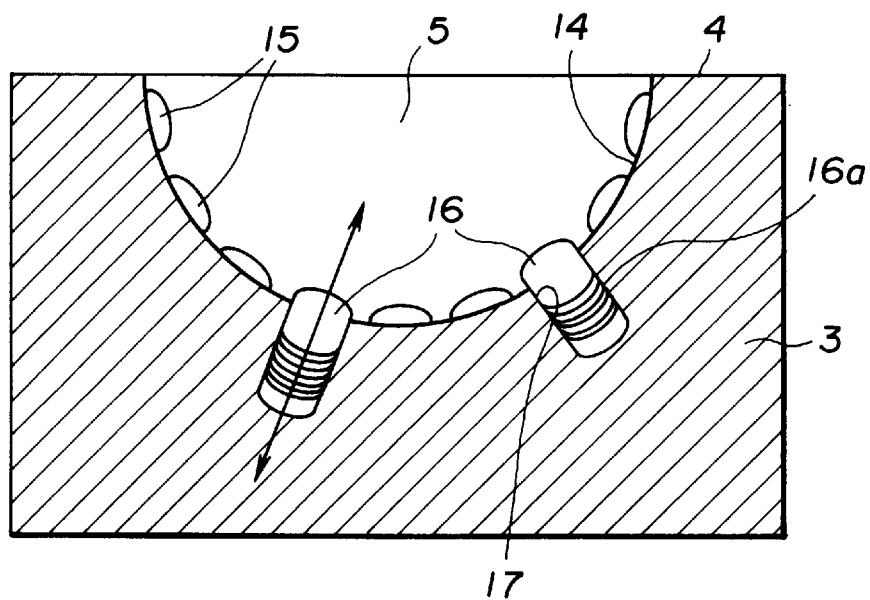
FIG. 2 is a cross-sectional view of a lower mold section having dimple-forming pins arranged in the cavity surface according to another embodiment of the invention.
Figure 3:
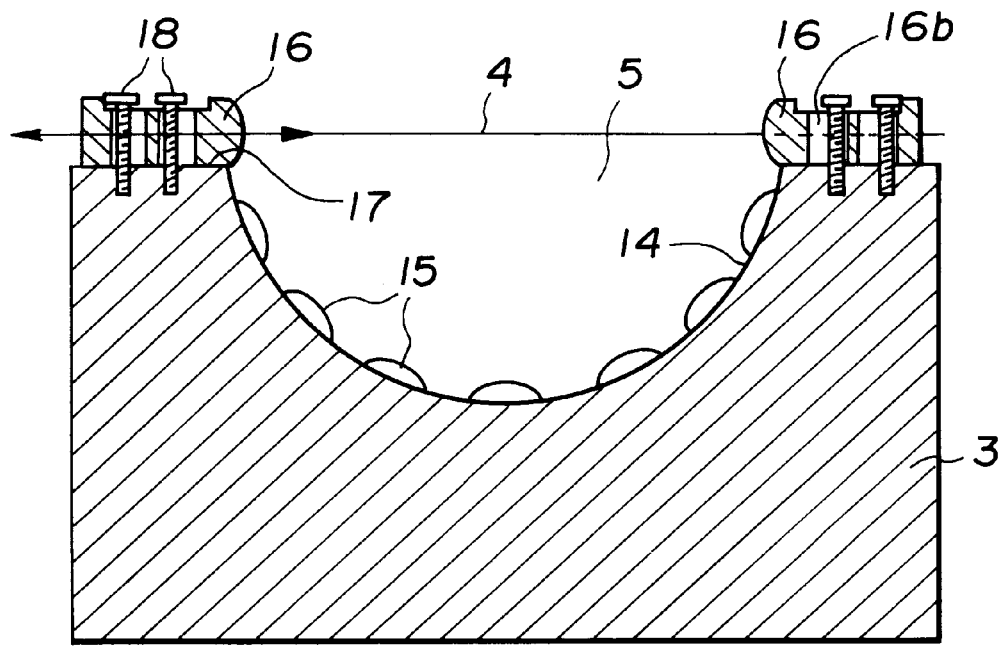
FIG. 3 is a cross-sectional view of a lower mold section having dimple-forming pins aligned with the parting surface according to a further embodiment of the invention.

Other preferred embodiments of the invention are shown in FIGS. 2 and 3. The mold of the invention includes the upper and lower mold sections 2 and 3 which are mated along the parting surface 4 to define a spherical cavity 5 between their inner surface as shown in FIG. 1. Since the upper and lower mold sections 2 and 3 are of substantially the same construction, only the lower mold section 3 is shown in FIGS. 2 and 3 and the description of the upper mold section is omitted.

In FIGS. 2 and 3, the cavity surface 14 of the lower mold section 3 is fixedly provided with a plurality of dimple-forming protrusions 15. Additionally, dimple-forming pins 16 each having a distal end of the same shape as the dimple-forming protrusions 15 are removably arranged for axial motion in the cavity surface 14. More particularly, in the embodiment of FIG. 2, the pin 16 is formed on the peripheral surface with an external thread 16a while an internal thread hole 17 (extending radially with respect to the spherical cavity) is drilled in the lower mold section 3 from the cavity surface 14. The pin 16 is received in the hole 17. The thread engagement between the external thread 16a and the internal thread 17 permits the pin 16 to move axially or radially (as depicted by an arrow) and to be detached. The pin 16 is removably mounted for axial motion to the lower mold section 3.

In the embodiment of FIG. 3, the dimple-forming pin 16 having a slot 16b is disposed on the joint surface of the lower mold section 3 such that the axis of the pin 16 is aligned with the parting surface 4. A bolt 18 is inserted through the slot 16b and screwed into the mold section 3 to secure the pin 16. The pin 16 is also removably mounted for axial motion to the lower mold section 3.

In the embodiments of FIGS. 2 and 3, the pin 16 has a distal end face disposed in the cavity 5. The distal end face 12 is provided with a projection 13 for stamping a symbol as shown in FIG. 5. The symbol stamping projection 13 is the same as described for the embodiment of FIG. 1.

The molds according to the embodiments of FIGS. 2 and 3 are advantageously used in compression molding. There are furnished a core and a pair of hemispherical cover shells. The core enclosed with the cover shells is compressed between the upper and lower mold sections to mold a golf ball. At the same time as compression molding, the ball is stamped by the symbol stamping projection 13 on the distal end face of the dimple-forming pin 16. The number of pins 16 having the projection 13 may be properly selected.

Accordingly, in the compression molds of FIGS. 2 and 3, the mark can be successively stamped on golf balls at the predetermined position to constant clearness in a simple and accurate manner as done by the core support pins and degassing pins in the injection mold of FIG. 1. The identification mark can be changed simply by exchanging the dimple-forming pins 16. Since the arrangement of the dimple-forming pins 16 in FIGS. 2 and 3 has a higher degree of freedom than the arrangement of the core support pins 7 and degassing pins 9 in FIG. 1, the mark can be stamped over a wider range.

Figure 4:
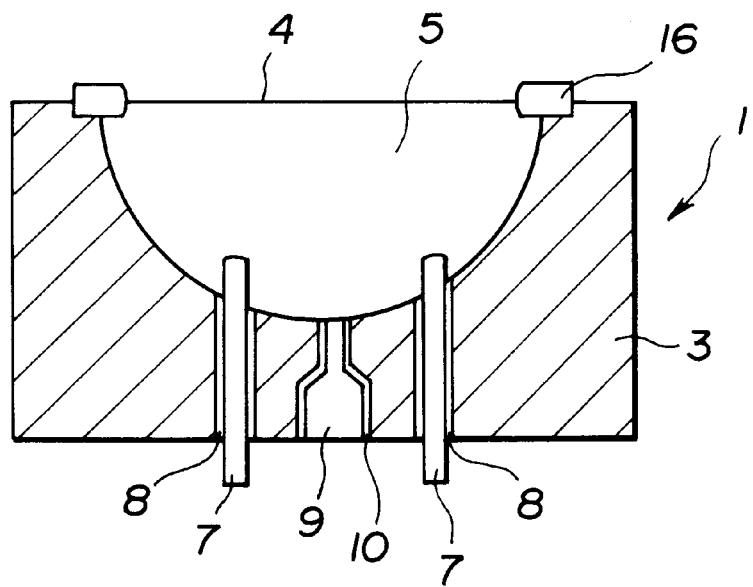
FIG. 4 is a cross-sectional view of a lower mold section equipped with core support pins, a degassing pin, and dimple-forming pins according to a still further embodiment of the invention.

FIG. 4 illustrates a further embodiment of the invention. The golf ball mold of this embodiment includes core support pins 7, a stationary degassing pin 9, and dimple-forming pins 16 in a lower mold section 3. Some or all of the pins 7, 9 and 16 are provided at their distal end face 12 with a projection 13 for stamping a symbol as shown in FIG. 5. A golf ball can be molded in this mold by a conventional method while a mark is simultaneously stamped on the ball. The mark can be stamped over a wider range.

The mold of the present invention for molding golf balls is capable of stamping an identification mark on the golf balls at the same time as their molding. The mark is successively stamped on the balls at a predetermined position to a constant clearness in a simple accurate manner.

Japanese Patent Application No. 354535/1996 is described, many modifications and variations may be made thereto in the light of the above teachings. It is therefore to be understood that within the scope of the appended claims, the invention may be practiced otherwise than as specifically described.

What is claimed is:

1. A golf ball mold for injection molding comprising; a pair of mold sections removably mated to define a spherical cavity therein, a plurality of core support pins for supporting a core at the center of the cavity, and a degassing pin for venting gas in the cavity, wherein the core support pins and the degassing pin each have a distal end face disposed in the cavity, and at least one of the distal end faces on a core support pin and said degassing pin provided with a projection for stamping a symbol, wherein said core support pin or degassing pin having the projection for stamping a symbol, wherein said core support pin or degassing pin having the projection for stamping a symbol is provided so that it is exchangeable with a new pin having a different stamping projection.

2. A golf ball mold as set forth in claim 1, wherein distal end faces of both said core support pin and said degassing pin have a projection for stamping a symbol.

3. A golf ball mold for compression molding comprising; a pair of mold sections removably mated to define a spherical cavity between their inner surfaces, the cavity surfaces being provided with a plurality of dimple-forming protrusions, wherein some of the dimple-forming protrusions are constructed by dimple-forming pins having substantially the same distal end face shape as the protrusions, the distal end face of at least one dimple-forming pin provided with a projection for stamping a symbol, wherein said dimple-forming pin having the projection for stamping a symbol is removably arranged for axial motion and is provided so that it is exchangeable with a new pin having a different stamping projection.

4. A golf ball mold as set forth in claim 3, wherein a plurality of said dimple forming pins each have a projection for stamping a symbol.

5. A golf ball mold for injection molding comprising; a pair of mold sections removably mated to define a spherical cavity therein, a plurality of core support pins for supporting a core at the center of the cavity, and a degassing pin for venting gas in the cavity, the cavity surfaces being provided with a plurality of dimple-forming protrusions, wherein the core support pins and the degassing pin each have a distal end face disposed in the cavity, and at least one of the distal end faces on a core support pin and degassing pin provided with a projection for stamping a symbol, and some of the dimple-forming protrusions are constructed by dimple-forming pins having substantially the same distal end face shape as the protrusions, the distal end face of at least one dimple-forming pin provided with a projection for stamping a symbol, wherein said core support pin or degassing pin having the projection for stamping a symbol is provided so that it is exchangeable with a new pin having a different stamping projection, and said dimple-forming pin having the projection for stamping a symbol being removably arranged for axial motion and is provided so that it is exchangeable with a new pin having a different stamping projection.

6. A golf ball mold as set forth in claim 5, wherein a plurality of said dimple forming pins each have a projection for stamping a symbol.

7. A golf ball mold as set forth in claim 5, wherein distal end faces on both said core support pin and said degassing pin have a projection for stamping a symbol.

8. A golf ball mold of claim 5, wherein said degassing pin is fixed and has a projection for stamping a symbol.

9. A golf ball mold of claim 5, wherein distal end faces of both said core support pin, said degassing pin and a plurality of said dimple-forming pins each have a projection for stamping a symbol.

* * * * *